United States Patent [19]

Spiegl

[11] Patent Number: 5,798,045
[45] Date of Patent: Aug. 25, 1998

[54] WATER TREATMENT PROCESS AND SYSTEM

[75] Inventor: Peter Spiegl, Aidlingen/Württ, Germany

[73] Assignee: Karl Spiegl GmbH & Co., Germany

[21] Appl. No.: 705,409

[22] Filed: Aug. 29, 1996

[30] Foreign Application Priority Data

Aug. 31, 1995 [DE] Germany ............... 195 32 074.3

[51] Int. Cl.⁶ ............................................. C02F 1/42
[52] U.S. Cl. ..................... 210/662; 210/687; 210/96.1; 210/191
[58] Field of Search ................... 210/662, 678, 210/687, 96.1, 190, 191, 275, 277, 278

[56] References Cited

U.S. PATENT DOCUMENTS

| | | | |
|---|---|---|---|
| 3,616,920 | 11/1971 | Cambot | 210/190 |
| 4,332,678 | 6/1982 | Spiegl | 210/86 |
| 4,385,992 | 5/1983 | Clauer et al. | 210/96.1 |
| 5,069,779 | 12/1991 | Brown et al. | 210/190 |

FOREIGN PATENT DOCUMENTS 0068895  1/1983  European Pat. Off.
2419387  11/1974  Germany.
2910869  9/1980  Germany.
3625337  2/1987  Germany.

*Primary Examiner*—Ivars Cintins
*Attorney, Agent, or Firm*—Renner, Otto, Boisselle & Sklar, P.L.L.

[57] ABSTRACT

The object of the invention is a process for treating, in particular softening water by ion exchange in a regenerable medium, with exhaustion of the medium being measure in a bypass provided parallel to the main flow of the medium to the water sampling point and a suitable system in which the bypass line includes a measuring cell. It is therefore the aim of the invention to secure a flow through the measuring cell irrespective of that of the medium. In order to achieve this aim, control of the main flow and a suitable increase of the pressure gradient in the bypass, irrespective of the flow, is effected by means of a control unit (40), increasing the pressure reduction in the measuring cell irrespective of the flow. The throttling of the main flow results in a relative reduction of the bypass resistance and therefore all increased flow to the measuring cell.

10 Claims, 2 Drawing Sheets

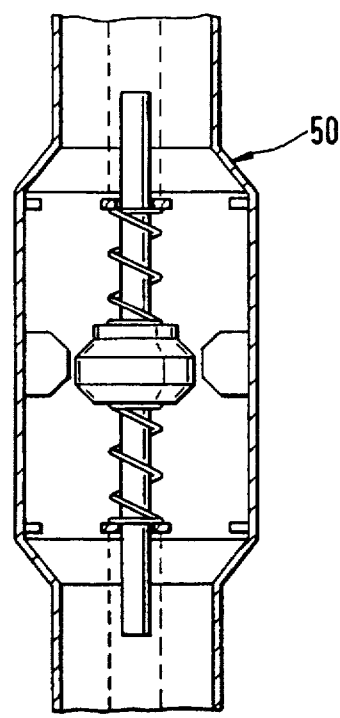
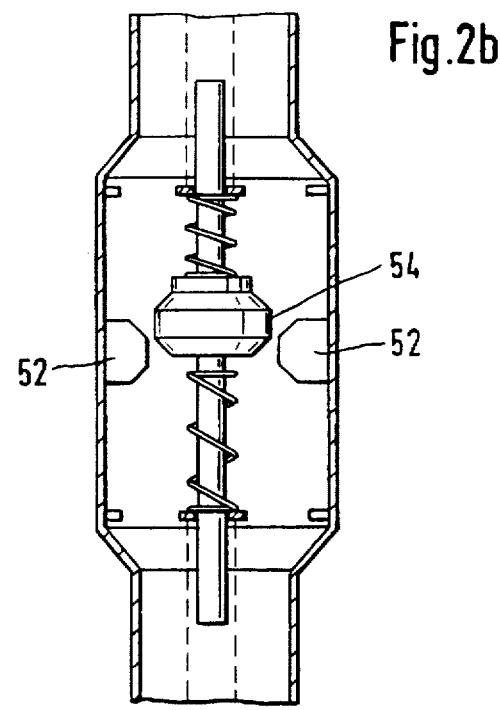
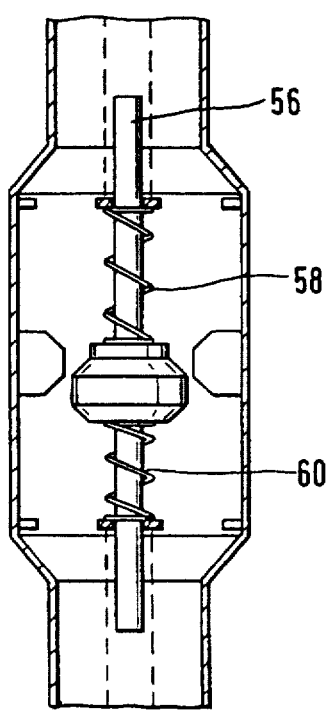

5,798,045

1

WATER TREATMENT PROCESS AND SYSTEM

FIELD OF THE INVENTION

The invention relates to a process for the treatment of water, in particular for softening it, and a system for applying the process.

BACKGROUND

In an appropriate water softening system according to FIG. 3 of DE 36 25 337 A1 (Spiegl), a ½-way valve (60) is included in the bypass flow line (83), allowing a selectable control condition for regeneration of the ion-exchanging medium of the measuring cells (29) and a control position connecting the two connecting points of the interrupted bypass line, which is a prerequisite for the following. A problem in the known system is the fact that the flow through the measuring cell for assessing the momentary hardness or cell regeneration is not adequate under any operating condition in order to obtain certain measuring and/or regeneration results. The pressure gradient at the measuring cell being too low has been found as a cause for insufficient flow, subject to a specific pressure reduction over the main flow line.

SUMMARY

The invention is therefore based on the aim of ensuring the flow through the measuring cell more or less independent from that of the ion-exchanging medium. This problem has been solved according to the invention by a process for the treatment, particularly softening, of water by ion-exchange in a regenerable medium and/or a system for applying the treatment process. Softened water is removed from the regenerable medium under back pressure. The exhaustion of the regenerable medium is measured in a bypass parallel to the main flow from the medium to the removal point. The main flow is throttled essentially irrespective of the flow rate, thus increasing the pressure gradient of the bypass. The system includes an ion-exchanger, a main flow line and a bypass flow line. The main and bypass flow lines are arranged parallel to each other and conduct from the exchanger to the water removal point. The bypass flow line includes a measuring cell 29 and the main flow line 42 includes a throttling valve increasing the pressure reduction in the measuring cell 29 essentially irrespective of the flow rate (see FIG. 1). The unit reducing the pressure of the main flow irrespective of the existing flow leads to a relative reduction in the bypass flow resistance, thus causing an adequate flow through the measuring cell.

A preferred application of the process according to the invention reverses the direction of the main and bypass flow during regeneration and/or reverse flushing, thereby also reversing the controlling effect. A preferred embodiment of the system according to invention includes an independently adjustable throttling valve 40 used as a control unit (FIG. 2). The throttling valve includes an annular valve seat and a movable valve body which fits through the valve seat to close the valve. The valve body is movable between opposite sides of the valve seat in response to flow through the main flow line in a main flow direction and a counterflow direction, respectively. The valve body is held in a static equilibrium by at least one spring in the absence of any flow through the valve seat. According to a preferred embodiment of the invention, the throttling valve is oriented vertically and the valve body has a weight which counterbalances the spring. Alternatives to the above include systems using a differential pressure regulator as a control unit and using two non-parallel check valves.

DETAILED DESCRIPTION OF THE INVENTION

Figure 1:
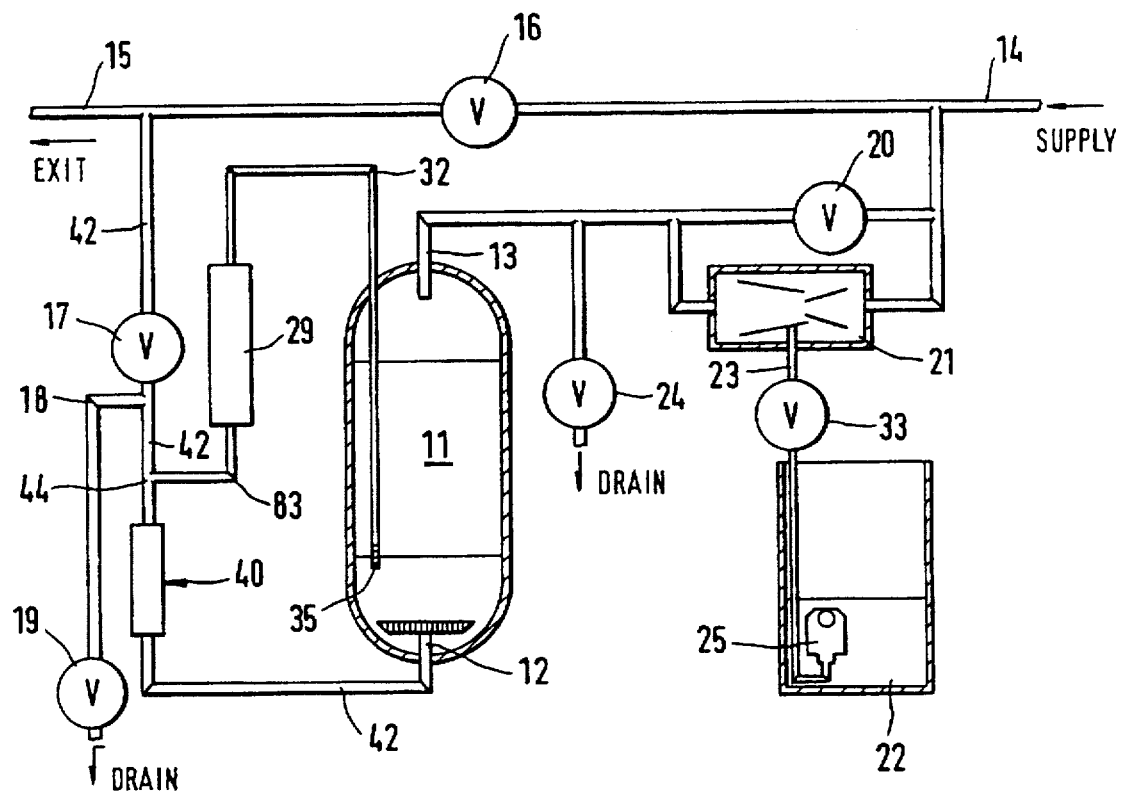

The following is a detailed description of the invention based on the preferred embodiment, shown as an example in the drawing, of a water softening system according to the invention, where:

FIG. 1 is a circuit diagram of the full system

FIG. 2 a to c are three longitudinal sections of a throttling valve of the system in three internal conditions:

(a) off mode (b) softening/regenerating mode (c) reverse flow mode

The embodiment of the system according to the invention corresponds, according to the state of technology, to a system described in FIG. 3 of DE 36 25 337 A1 with the exception of a ½-way valve (60) and a brine feed line (61), which are not included, where a water mains 42 is interrupted by a throttling valve 40, connecting a sampling line 12, which has been partially replaced by the same, to the soft water discharge line 15, with the test water line 83 connected in between the throttling valve 40 and the shut-off valve 17 at point 44. The design and function of the known system are described in line 59 of column 11 to line 58 of column 13 of DE 36 25 337 A1. References used in the said specification have been used here.

The throttling valve is a throttle 40 (see FIG. 2), including a cylindrical housing 50 widening the section of line 42, with an annular valve seat 52 being arranged in its axial centre and a piston-type valve body 54, being accurately controllable for shutting of in axial direction by the same, in the main or counter flow when moved axially in one or the other flow direction from the valve seat 52, being held in equilibrium by two helical springs 58 and 60 on the seat 52, arranged on an axial piston guide rod 56 while no flow is passing through the throttling valve.

As shown in FIGS. 2a–2c, during hardening and regeneration by means of brine and flushing of the same, the throttling valve 40 changes its condition from a to b and from a to c during reverse flushing when the valves 16, 17 and 24 are opened whilst the other valves 19, 20 and 33 are closed. The throttling valve 40 is therefore always in operation during flow irrespective of any of the two possible directions.

I claim:

1. A process for the softening of water by ion-exchange in a regenerable medium, from which softened water is removed under back pressure, comprising the steps of: bypassing part of the flow from the regenerable medium through a bypass flow line in parallel with a main flow line through which the softened water is removed, the bypass flow line including a measuring cell for measuring a property of the water passing therethrough; and increasing the pressure gradient across the measuring cell by throttling the main flow passing through the main flow line.

2. A process according to claim 1, further comprising reversing the direction of the main and bypass flow.

3. A process according to claim 1, wherein the increasing step provides for an increase in the pressure gradient essentially independently of the flow rate through the main flow line.

4. A system for the softening of water, comprising an ion-exchanger, a main flow line through which the softened water is removed and a bypass flow line arranged in parallel with the main flow line, the bypass flow line including a measuring cell for measuring a property of the water passing therethrough, and the main flow line including a throttling valve for increasing the pressure gradient across the measuring cell.

5. A system according to claim 4, wherein the throttling valve is independently adjustable.

6. A system according to claim 5, wherein the throttling valve includes a valve seat and a movable valve body which fits through the valve seat to close the valve, the valve body being movable between opposite sides of the valve seat in response to flow through the main flow line in a main flow direction and a counter flow direction, respectively, and wherein the valve body is held in a static equilibrium by at least one spring in the absence of any flow through the valve seat.

7. A system according to claim 6, wherein the throttling valve is oriented vertically and the valve body has a weight which counterbalances the spring.

8. A system according to claim 4, wherein the throttling valve is a differential pressure regulator.

9. A system according to claim 4, wherein the throttling valve is two non-parallel check valves.

10. A system according to claim 4, wherein the throttling valve provides for an increase in the pressure gradient essentially independently of the flow rate through the main flow line.

* * * * *